M. KINSEY.
Revolver.
No. 20,496.
Patented June 8, 1858.
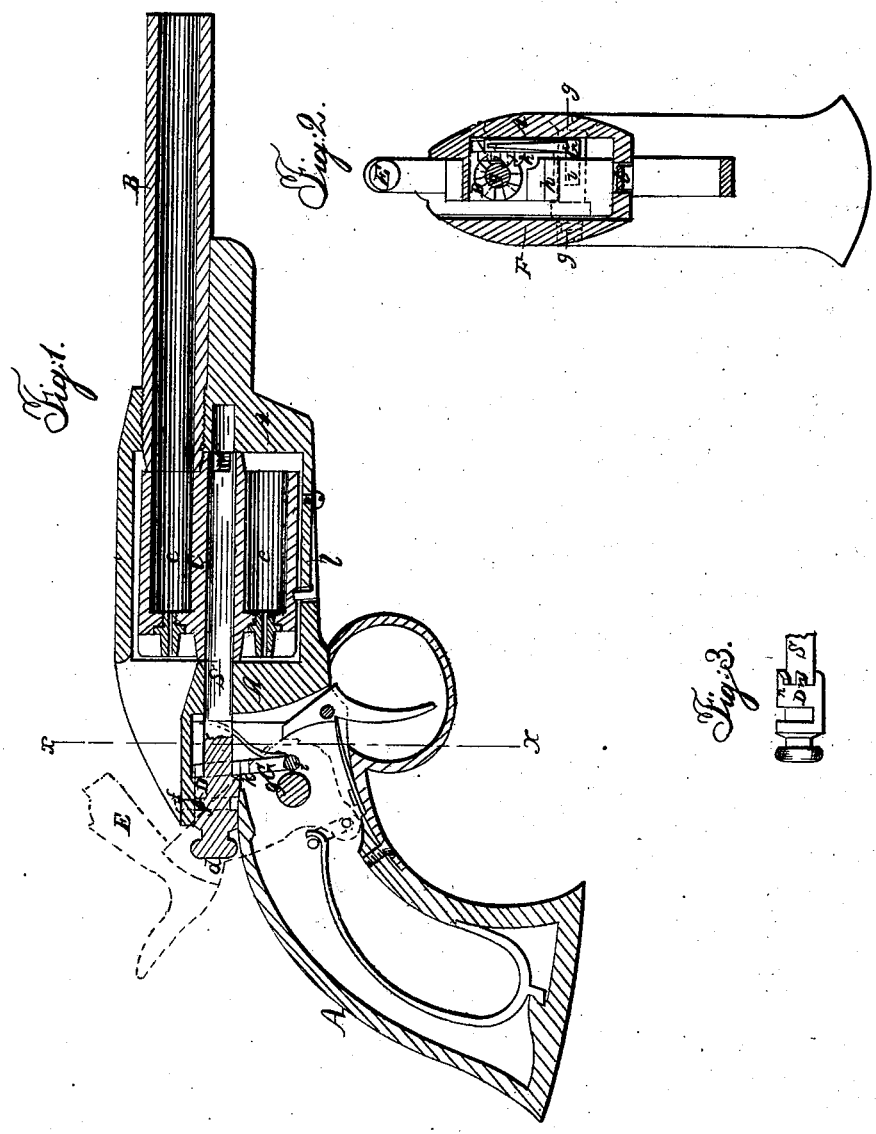

UNITED STATES PATENT OFFICE.

M. KINSEY, OF NEWARK, NEW JERSEY.

IMPROVEMENT IN REVOLVING FIRE-ARMS.

Specification forming part of Letters Patent No. 20,496, dated June 8, 1858.

*To all whom it may concern:*

Be it known that I, MOSES KINSEY, of Newark, in the county of Essex and State of New Jersey, have invented a new and useful Improvement in Revolving-Cylinder Fire-Arms; and I do hereby declare that the following is a full, clear, and exact description of the same, reference being had to the accompanying drawings, forming part of this specification, in which—

Figure 1 is a longitudinal central section of a pistol with my improvement. Fig. 2 is a transverse section of the same in the line $xx$ of Fig. 1. Fig. 3 is a side view of the ratchet-wheel.

Similar letters of reference indicate corresponding parts in both figures.

This invention consists in furnishing the dog, which is attached to the hammer for the purpose of rotating the chambered cylinder, with an additional tooth, so arranged relatively to the tooth by which the cylinder is rotated and to the ratchet-wheel of the cylinder as to act as a stop in combination with one of the teeth of the cylinder to prevent the latter being rotated beyond the proper distance, the teeth of the ratchet-wheel being properly formed for the purpose.

To enable others to make and use my invention, I will proceed to describe its construction and operation.

A is the metal frame which contains the cylinder C, and forms the principal portion of the stock, and into which the barrel B is screwed.

S is the main spindle, which is inserted through the back of the frame A, and through a hole bored through the axis of the cylinder, and enters a bearing in the front part of the frame. This spindle has a square or flat formed upon it at $a$ in Fig. 1, to fit into a corresponding square or flat in the bore of the cylinder to compel said cylinder to turn with it; and it has formed upon or securely attached to its rear portion a ratchet-wheel, D, with teeth on its front face corresponding in number with the chambers $c\ c$ in the cylinder C, and between the back of this ratchet-wheel and the projecting head $d$ of said spindle, which permits it to be laid hold of to draw it out of the cylinder, is formed a groove, $e$, which receives the point of a screw, $f$, that is screwed into the frame A for the purpose of preventing the drawing out of the spindle, but which permits the rotation thereof. By taking out this screw permission to withdraw the spindle for the purpose of taking out the cylinder is obtained.

E is the hammer, which turns freely on a pin, $g$, which passes through one side of the frame A and screws into a movable plate, F, which can be taken off to expose the lock by unscrewing the said pin from it. The hammer is made with a deep boss, $h$, on one side, as shown in Fig. 2, which boss contains a hole to receive a pin, $i$, which is firmly secured to the dog G, by which the rotation and stoppage of the cylinder C is effected, the said pin serving to attach said dog to the hammer, that the dog may be operated to rotate the cylinder by the cocking of the hammer. The dog G has the tooth $j$, which acts upon the ratchet-wheel D to rotate the cylinder formed at its upper extremity, and the said tooth performs its duty by the upward movement of the dog produced by drawing back the hammer to cock it. The dog operates on the opposite side of the main spindle S to the hammer. It is kept in contact with the ratchet-wheel by the spring $k$, which is attached to the said dog, and which bears against the portion of frame A which constitutes the recoil-shield to the cylinder.

Some distance below the tooth $j$ is the stop-tooth $k$, which constitutes my invention, said tooth standing out from the side of the said dog toward the hammer in such a position that as the hammer arrives at full-cock and the dog completes the rotation of the breech the next tooth but one in arrear of that which has been operated upon by the tooth $j$ to produce the rotation arrives in contact with it $k$ and prevents the cylinder rotating beyond the proper point by the momentum it may have acquired. To make the tooth $k$ operative on the ratchet-wheel the backs of said teeth are not inclined all the way to their bases, but at the bottoms are formed square with the bases, as shown at $n\ n$, in Fig. 3.

$l$ is the spring-stop usually employed to prevent the return of the cylinder with the dog, as the latter returns when the hammer falls.

What I claim as my invention, and desire to secure by Letters Patent, is—

Furnishing the dog G with the additional tooth $k$, arranged to operate in combination with square or equivalently-formed bottom parts of the backs of the teeth of the ratchet-wheel D, in the manner and for the purpose depose described.

MOSES KINSEY.

Witnesses:
W. TUSCH,
W. HAUFF.